(12) United States Patent
Kim et al.

(10) Patent No.: US 8,624,995 B2
(45) Date of Patent: Jan. 7, 2014

(54) AUTOMATIC WHITE BALANCING METHOD, MEDIUM, AND SYSTEM

(75) Inventors: Sung-su Kim, Yongin-si (KR);
Byoung-ho Kang, Yongin-si (KR);
Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1460 days.

(21) Appl. No.: 11/802,225

(22) Filed: May 21, 2007

(65) Prior Publication Data

US 2007/0285530 A1 Dec. 13, 2007

(30) Foreign Application Priority Data

May 26, 2006 (KR) .......................... 10-2006-0047751

(51) Int. Cl.
*H04N 9/73* (2006.01)
*H04N 5/222* (2006.01)

(52) U.S. Cl.
USPC ....................................... 348/223.1; 348/370

(58) Field of Classification Search
USPC .............. 348/221.1, 223.1, 362–368, 113.1, 348/224.1, 370, 371
See application file for complete search history.

(56) References Cited

U.S. PATENT DOCUMENTS

| 5,448,502 | A | * | 9/1995 | Kindo et al. | 382/165 |
| 5,530,474 | A | * | 6/1996 | Takei | 348/224.1 |
| 5,684,359 | A | * | 11/1997 | Yano et al. | 313/487 |
| 6,359,651 | B1 | * | 3/2002 | Yokonuma | 348/370 |
| 6,504,952 | B1 | * | 1/2003 | Takemura et al. | 382/167 |
| 6,665,434 | B1 | * | 12/2003 | Yamaguchi | 382/162 |
| 6,788,813 | B2 | * | 9/2004 | Cooper | 382/167 |
| 7,352,895 | B2 | * | 4/2008 | Speigle et al. | 382/162 |
| 7,728,880 | B2 | * | 6/2010 | Hung et al. | 348/223.1 |
| 2003/0020826 | A1 | * | 1/2003 | Kehtarnavaz et al. | 348/362 |
| 2006/0078182 | A1 | * | 4/2006 | Zwirn et al. | 382/128 |
| 2006/0176379 | A1 | * | 8/2006 | Hyodo | 348/223.1 |
| 2007/0025718 | A1 | * | 2/2007 | Mori et al. | 396/155 |

FOREIGN PATENT DOCUMENTS

| JP | 05-068258 | 3/1993 |
| JP | 05-083728 | 4/1993 |
| JP | 2000-102030 | 4/2000 |
| JP | 2002-290988 | 10/2002 |
| JP | 2005-33609 | 2/2005 |
| JP | 2005-109930 | 4/2005 |
| JP | 2005-236375 | 9/2005 |
| JP | 2006-033158 | 2/2006 |

OTHER PUBLICATIONS

Japanese Office Action dated Sep. 4, 2009, issued during examination of corresponding Japanese Patent Application No. 2007-120869.

* cited by examiner

*Primary Examiner* — Roberto Velez
*Assistant Examiner* — Tuan Le
(74) *Attorney, Agent, or Firm* — Staas & Halsey LLP (57) ABSTRACT

A white balancing detecting method, medium, and system. The white balancing method includes setting an illuminant detection region of an input image in accordance with an exposure integration time indicative of a collected amount of light when the image is taken, and detecting an illuminant by using data contained in the illuminant detection region in a color gamut of the image.

31 Claims, 12 Drawing Sheets

AUTOMATIC WHITE BALANCING METHOD, MEDIUM, AND SYSTEM

CROSS-REFERENCE TO RELATED APPLICATIONS

This application is based on and claims priority from Korean Patent Application No. 10-2006-0047751, filed on May 26, 2006 in the Korean Intellectual Property Office, the disclosure of which is incorporated herein in its entirety by reference.

BACKGROUND OF THE INVENTION

1. Field of the Invention

One or more embodiments of the present invention relate to a color reproduction technology, and more particularly, to a white balancing method, medium, and system.

2. Description of the Related Art

Though natural Light is typically thought of as being white, in actuality the light may have an abundance of one or more wavelengths resulting in the overall light having a peculiar color called a color temperature, expressed in Kevin (K). In general, since the human beings' visual ability automatically adjusts for such minor discrepancies, the human beings' cognitive difference for the colors is very insignificant even though light of a particular color temperature may be illuminated. However, image pick-up devices, such as a camera or a camcorder, sense colors, in which color temperatures are reflected, as they are. Accordingly, if an illuminant is changed, images taken by the image pick-up device are tingled with different colors.

For example, since the color temperature of sunlight around noon on a sunny day is considered to be high, the image taken by an image pick-up device will appear bluish on the whole. By contrast, since the color temperature of the sunlight just after sunrise or just before sunset is considered to be low, the image taken by the image pick-up device will appear reddish on the whole.

An auto white balancing (AWB) technique proposed to solve this problem compensates for distortions of the color tone of the image if the image is deflected toward any one of red (R), green (G), and blue (B) components depending upon its color temperature.

In one example, an image pick-up device discussed in Japanese Patent Unexamined Publication No. 2002-290988, divides an object into a plurality of regions, detects chromaticity in every region having a luminance higher than a threshold value, and calculates a gain value to perform white balancing based on the detected chromaticity.

However, such white balancing techniques have problems in that it is difficult to perform a consistent color reproduction in accordance with the color or dimension of an object existing in the image even though the image is taken under the same light source or illuminant.

SUMMARY OF THE INVENTION

Accordingly, the present invention has been made to solve such above-mentioned problems, with an aspect of one or more embodiments of the present invention being to improve the performance of color reproduction through a more stable illuminant estimation.

Additional aspects and/or advantages of the invention will be set forth in part in the description which follows and, in part, will be apparent from the description, or may be learned by practice of the invention.

To achieve the above and/or other aspects and advantages, embodiments of the present invention include a method with white balancing, including setting an illuminant detection region of an image based on an exposure integration time indicative of an amount of light collected for the image when the image was captured, and detecting an illuminant of the image by using data relative to the illuminant detection region in a color gamut of the image.

To achieve the above and/or other aspects and advantages, embodiments of the present invention include at least one medium including computer readable code to control at least one processing element to implement one or more embodiments of the present invention.

To achieve the above and/or other aspects and advantages, embodiments of the present invention include a system, including a setting unit to set an illuminant detection region of an image based on an exposure integration time indicative of an amount of light collected for the image when the image was captured, and a detection unit to detect an illuminant of the image by using data relative to the illuminant detection region in a color gamut of the image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
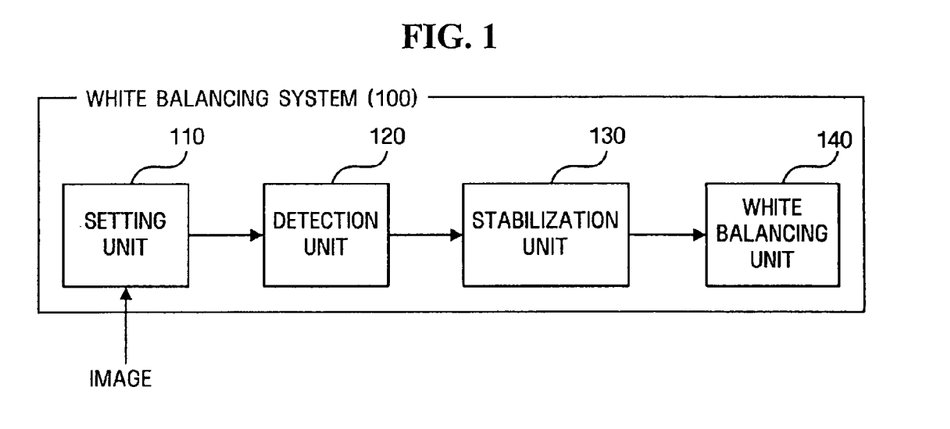
FIG. 1 illustrates a white balancing system, according to an embodiment of the present invention.

FIG. 1 illustrates a white balancing system 100, according to an embodiment of the present invention. The white balancing system 100 may include a setting unit 110, a detection unit 120, a stabilization unit 130, and a white balancing unit 140, for example. In differing embodiments, the white balancing system may be an image processing system such as a digital still camera, a digital video camcorder, and others, for example.

In addition, white balancing operations illustrated in FIG. 2 will be described with reference to the white balancing system 100, noting that the reference to the white balancing system 100 is merely used as an example for instructive purposes. The setting unit 110 may set an illuminant detection region for an input image, for example, in operation S210, e.g., by selectively using an exposure integration time (EIT) as a reference to determine the illuminant detection region. The EIT means a time required for collecting light when photographing/taking an image. However, the EIT is not limited to a temporal element, and may be determined by other information which can predict a collected amount of the light when the image is photographed/taken. More specifically, for example, the EIT may be determined by exposure information such as a shutter speed or an aperture value.

The EIT may also be provided together with an image to be input either at the time of the image photographing of the image or stored with or for the image for subsequent correction. For example, as the digital still camera attaches the exposure information at the time of the photographing of the image, such as shutter speed or aperture value, to the photographed image as additional data, the EIT may be attached to the image file, or imbedded in the image, as the additional data.

Figure 3:
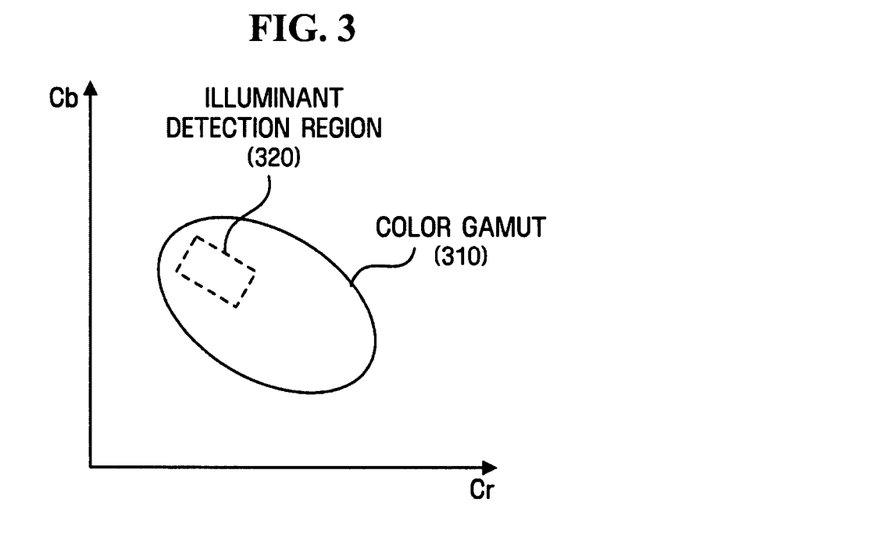
FIG. 3 illustrates an illuminant detection region, according to an embodiment of the present invention.

Meanwhile, the illuminant detection region represents a range of data to be used to detect an illuminant of the image, an example of which is shown in FIG. 3. The detection unit 120 may detect the illuminant by using data to be contained in an illuminant detection region 320, which may be set by the setting unit 110, in a color gamut 310 of the image, for example, in operation S220.

The illuminant detected by the detection unit 120 may reflect distorted information, e.g., in accordance with a deviation between devices or an amount of data sampled for detecting the illuminant, such that the stabilization unit 130 may further correct the detected illuminant so as to correct the distorted information, for example, in operation S230.

The white balancing unit 140 may further perform white balancing on the image by use of the corrected illuminant, for example, in operation S240. Since there are diverse known techniques for performing the white balancing on the image, the detailed description thereof will be omitted herein.

Figure 2:
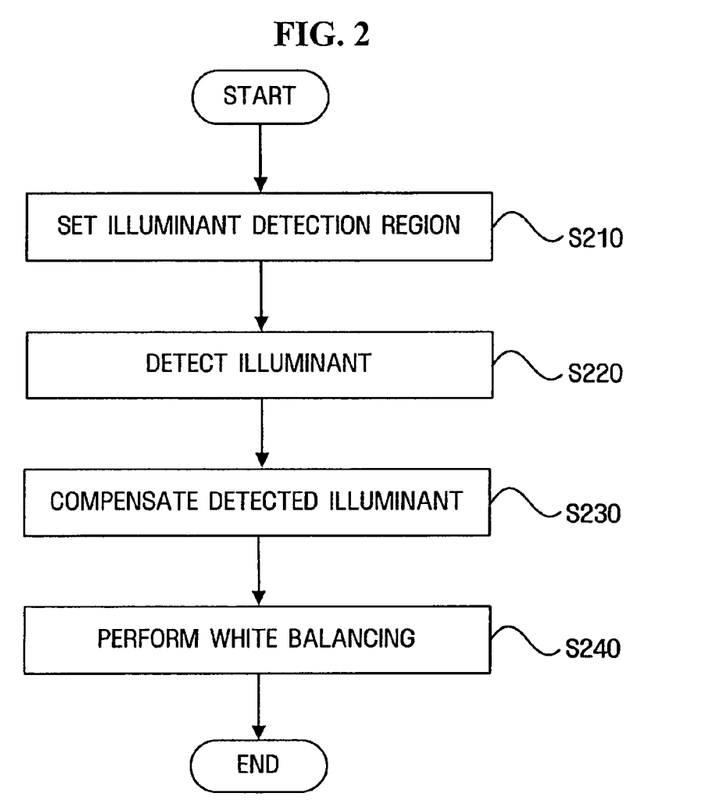
FIG. 2 illustrates a white balancing method, according to an embodiment of the present invention.

The example operation of setting the illuminant detection region for the input image can be performed by the setting unit 110 in FIG. 1, and can correspond to the operation S210 of FIG. 2, for example, noting that alternative operations and units for accomplishing the same are equally available.

Figure 4:
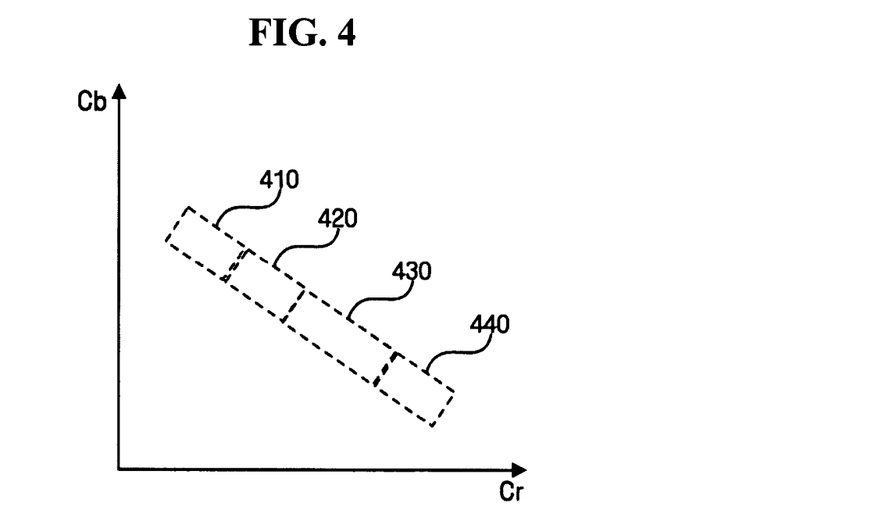
FIG. 4 illustrates a candidate region that can be set as an illuminant detection region, according to an embodiment of the present invention.

As described above, the setting unit 110 may set the illuminant detection region associated with the EIT. In an embodiment, by statistically analyzing the relationship between the EIT consumed when the image is taken and the point, in which the illuminant exists, in the color gamut of the taken image, any of the candidate regions 410 through 440 having a high possibility that the illuminant exists may be previously set in accordance with the EIT, as shown in FIG. 4. For example, if the EIT of the input image belongs to a range of 0 to N1, the setting unit 110 may set the first candidate region 410 as the illuminant detection region. Meanwhile, if the EIT of the input image belongs to a range of N1 to N2, the setting unit 110 may set the second candidate region 420 as the illuminant detection region. Other candidate regions 430 and 440 may be set as the illuminant detection region associated with the EIT of the input image.

According to the embodiment shown in FIG. 4, the candidate regions 410 through 440 may be fixed on chromaticity coordinates, and any one of the fixed candidate regions determined as the illuminant detection region. However, embodiments of the present invention are not limited thereto. For example, an alternative embodiment may be implemented which performs modeling of the point, in which the illuminant of the image exists, on the chromaticity coordinates in accordance with the EIT, and variably sets the illuminant detection region in accordance with the EIT of the input image. Such an embodiment will now be described in detail with reference to FIGS. 5A through 5C.

Figure 5A:
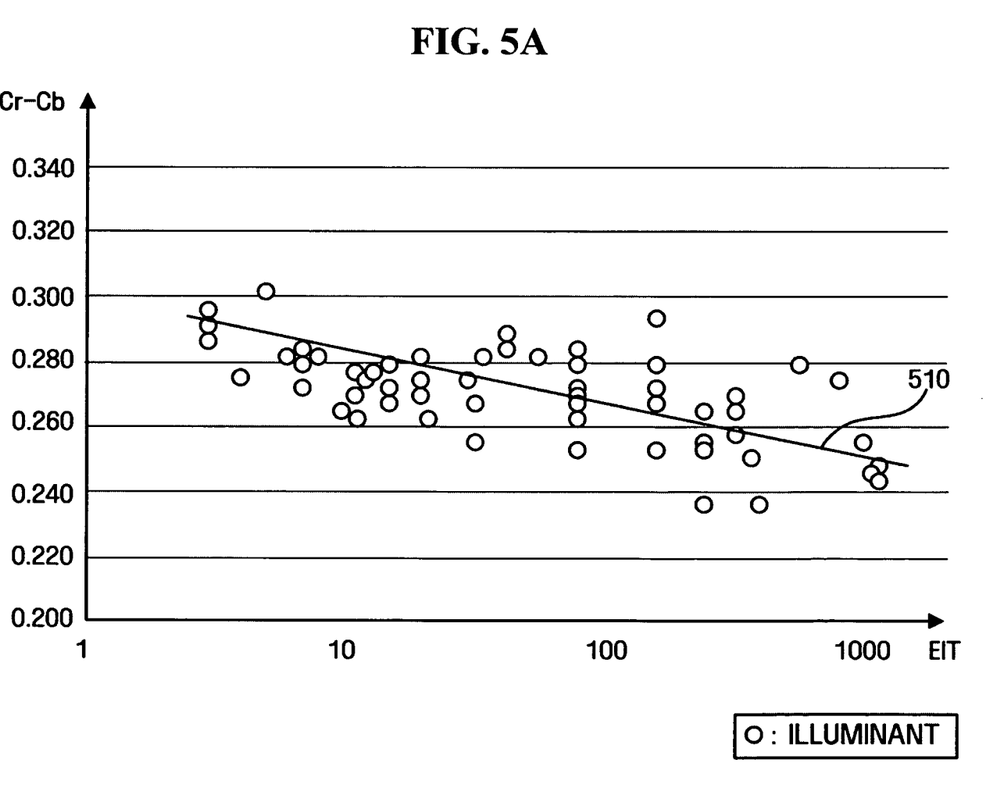
FIGS. 5A through 5C are illustrations explaining a setting of an illuminant detection region, according to an embodiment of the present invention.

FIG. 5A illustrates chromatic values of illuminants of respective images associated with respective EITs. Such information may be obtained through previous experiments or during operation of a respective camera device or white balancing system.

Figure 5B:
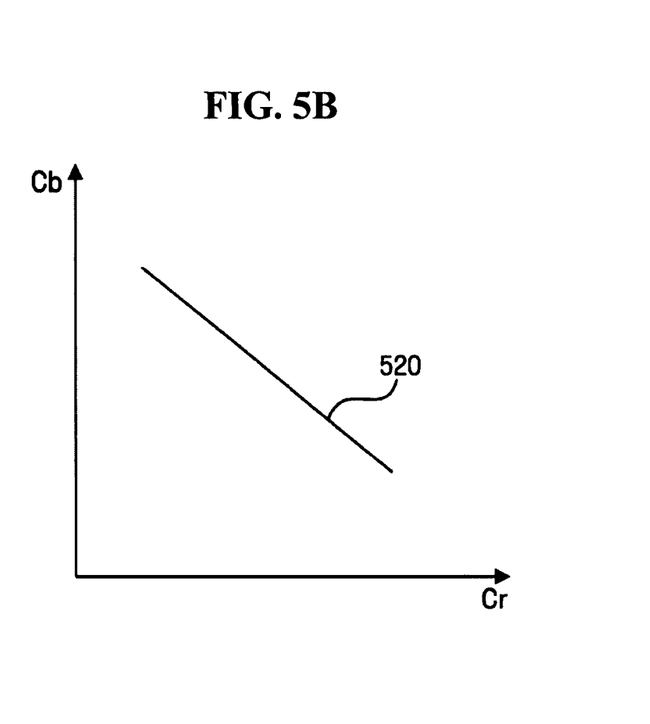

From such information, a modeling of a median chromaticity locus of the illuminant associated with the EIT can be performed. To this end, an average chromatic value of the illuminants corresponding to each EIT can be calculated, and a trend line 510 of the points representing each average chromatic value can be obtained. The obtained trend line can further be projected on the chromaticity coordinates to obtain the median chromaticity locus 520 of the illuminant, as shown in FIG. 5B.

The illustrated median chromaticity locus 520 of the illuminant associated with any particular EIT may not be previously set, and the setting unit 110 can obtain the central illuminant point corresponding to the EIT of the image to be input from the median chromaticity locus 520 of the illuminant.

Figure 5C:
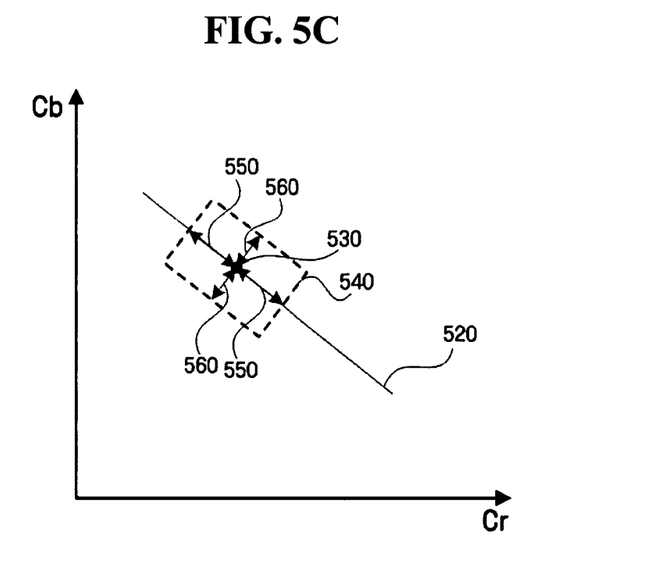

In an embodiment, if the central illuminant point is obtained, the setting unit 110 may then set a given range as the illuminant detection region 540 based on the central illuminant point 530, as shown in FIG. 5C. In one embodiment, the illuminant detection region 540 can be set from the central illuminant point 530 to the first threshold distance 550 in the median chromaticity locus 520 of the illuminant, and to the second threshold distance 560 in a direction perpendicular to the median chromaticity locus 520 of the illuminant. Herein, the first threshold distance and the second threshold distance may be set in accordance with the tendency of the chromaticity distribution of the illuminant associated with the EIT, which again may be previously determined by experiment or previous operation.

The first threshold distance and the second threshold distance may be determined dynamically in accordance with the EIT. For example, if it is assumed that when the EIT is low, the chromaticity distributed range of the illuminant is narrow, while when the EIT is high, the chromaticity distributed range of the illuminant is wide, at least one of the first threshold distance and the second threshold distance may be altered in accordance with the EIT, so as to reflect this observed tendency. Here, alternate tendencies may also be observed depending on embodiment.

Figure 6A:
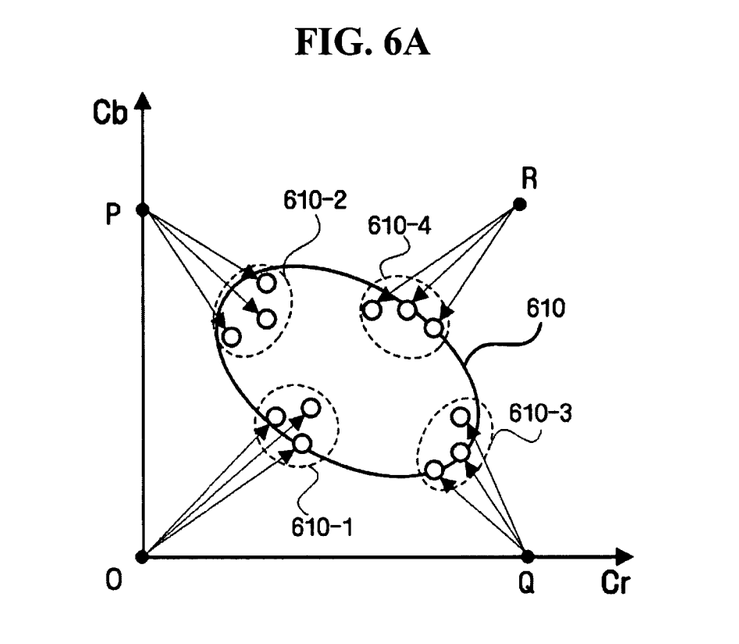
FIGS. 6A through 6E are illustrations explaining an obtaining of variation of color gamut and a central point, according to an embodiment of the present invention.

According to one embodiment, the setting unit 110 may additionally use a variance of the color gamut of the image to be input and the central point of the color gamut, so as to set the illuminant detection region, as shown in FIG. 6A.

In order to obtain the variance of the color gamut, the setting unit 110 may select the illustrated threshold number of data 610-1 through 610-4 in near order from four reference points O, P, Q, and R on the chromaticity coordinates in the color gamut of the image to be input.

Figure 6B:
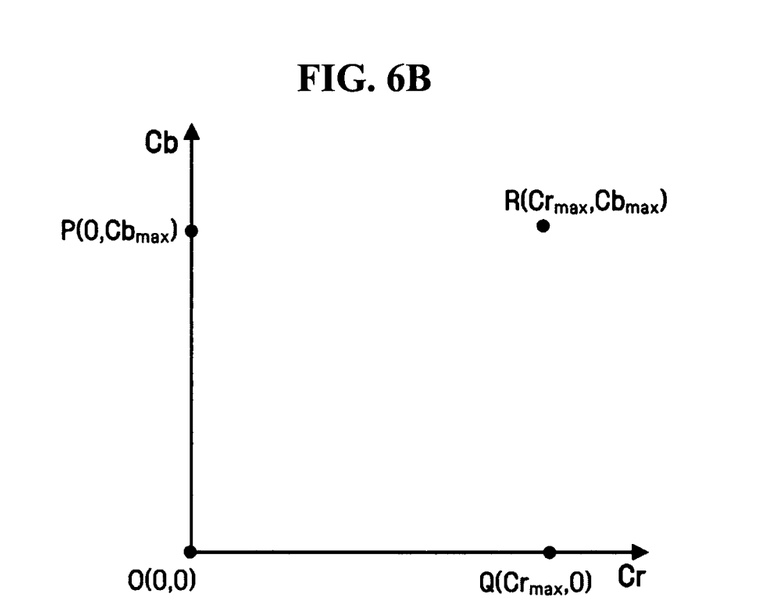

The four reference points, according to an embodiment of the present invention, include, as shown in FIG. 6B, an origin O (0,0) of the chromaticity coordinates, a point P (Cr-max, 0) indicative of the maximum Cr value, Cr-max, which can be possessed by a general image on a Cr-axis, a point Q (Cb-max, 0) indicative of the maximum Cb value, Cb-max, which can be possessed by a general image on a Cb-axis, and a coordinate point R (Cr-max, Cb-max) indicative of the maximum Cr value and the maximum Cb value.

Figure 6C:
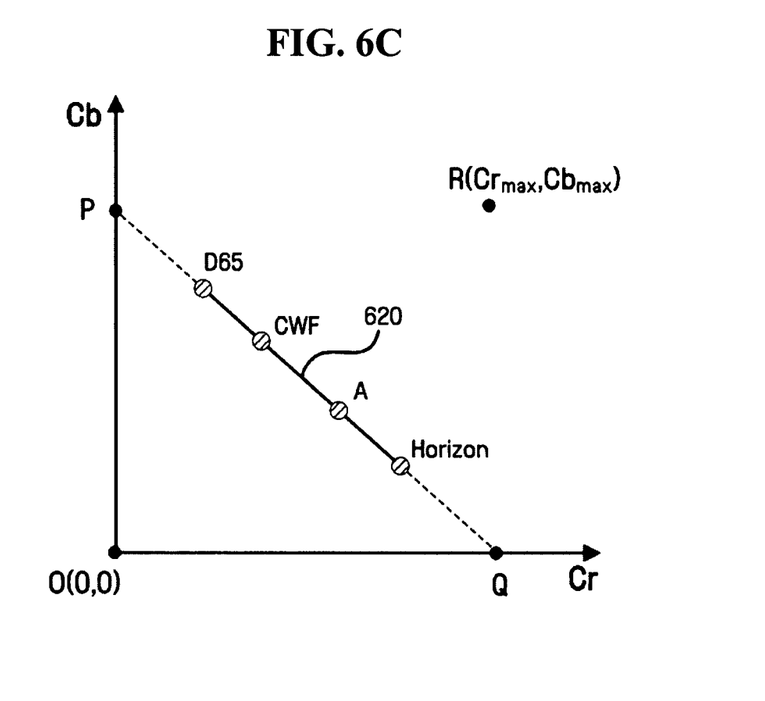

FIG. 6C illustrates four such reference points, according to alternative embodiment of the present invention, with two reference points O (0,0) and R(Cr-max, Cb-max) among four reference points being similar to those of the embodiment in FIG. 6B. However, the other two reference points P and Q are cross points formed by the axes of two chromaticity coordinates and an extension of the reference illuminant locus 620. The reference illuminant locus 620 means a trend line based on the chromaticity of diverse types of standard illuminants (e.g., D65, D50, CWF (Cool White Fluorescent), A, Horizon, and others) which are proper to characteristics of a device (e.g., a digital still camera including a white balancing system 100) capturing an image.

Figure 6D:
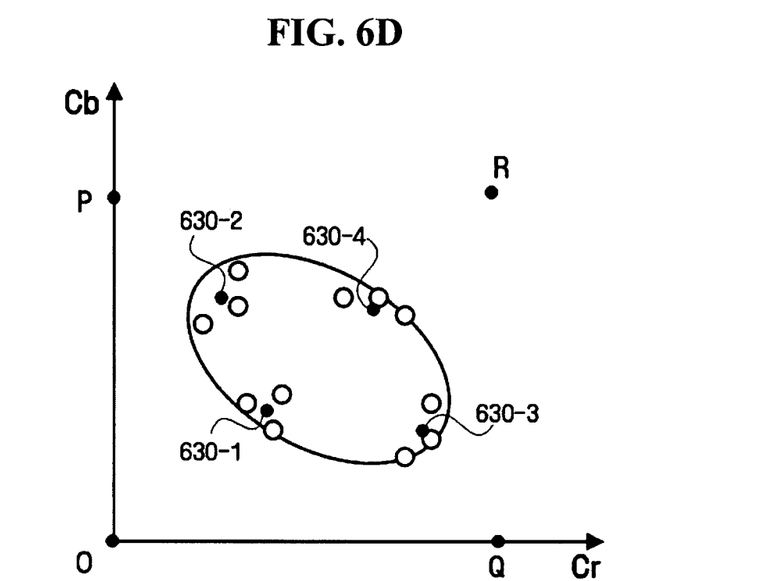

As illustrated in FIG. 6D, if the threshold number of data is selected in near order from each reference point, the setting unit 110 may determine edge points 630-1, 630-2, 630-3, and 630-4 having the average chromatic value of the data every selected data through each reference point.

Figure 6E:
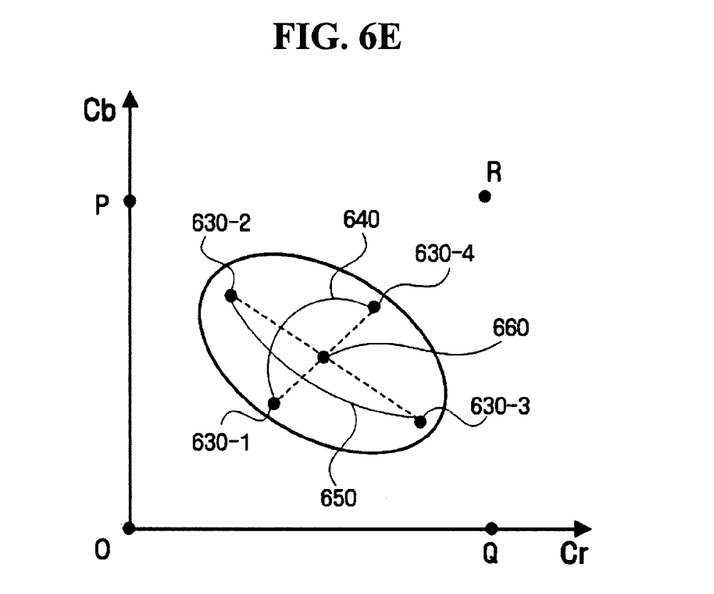

After that, as illustrated in FIG. 6E, the setting unit 110 may calculate a distance between the edge points derived from the diagonal reference points among four reference points. That is, the setting unit 110 may calculate a distance 640 (referred to as a color gamut height) between the edge point 630-1 derived from the reference point O and the edge point 630-4 derived from the reference point R, and a distance 650 (referred to as a color gamut width) between the edge point 630-2 derived from the reference point P and the edge point 630-3 derived from the reference point Q.

Then, the setting unit 110 may determine whether the color gamut height 540 and the color gamut width 650 exist in a given threshold range, respectively. If the color gamut height 540 and the color gamut width 650 satisfy the given threshold range, the setting unit 110 may use the illuminant detection region determined in accordance with the EIT as it is, since it may be considered that the input image has a normal color distribution. However, if the color gamut height 540 and the color gamut width 650 are found to be outside of the threshold range, it can be understood that the input image has an abnormal color distribution, since the color gamut of the input image is excessively wider or narrower than a normal case. In this instance, where the color gamut height 540 and the color gamut width 650 are outside of the threshold range, if a portion of the color gamut of the input image were to be determined to be the illuminant detection region in accordance with the EIT, there is a high possibility that the correct illuminant would not be detected. Accordingly, the setting unit 110 can set the color gamut of the input image as the illuminant detection region irrespective of the EIT, such as through conventional techniques, after such a detection that the color gamut height or the color gamut width is out of the threshold range.

Since the variance of the color gamut indicates the uniformity of the color gamut, embodiments of the present invention are not limited to the above described methods of calculating the variance of the color gamut. For example, the setting unit 110 may select the threshold number of data in the color gamut of the input image in near order from four reference points, and predict the variance of the color gamut by use of the distance between the points having the mean chromaticity of the selected data. Alternate methods are also available.

Returning to FIG. 6E, in another embodiment, the central point of the color gamut can be determined as a cross point 660 of a segment representing the color gamut height and the color gamut width. The setting unit 110 may determine whether the use of the illuminant detection region determined in accordance with the EIT is appropriate through the central point 660 of the color gamut.

For example, modeling can be performed of the point, on which the illuminant of the image exists, on the chromaticity coordinates in accordance with the central point 660 of the color gamut, similar to the method of modeling the point, on which the illuminant of the image exists, on the chromaticity coordinates in accordance with the EIT. That is, the point, on which the illuminant of the image can exist, may be set as a desired number of regions on the chromaticity coordinates in accordance with the central point 660 of the color gamut.

Then, it can be determined whether the use of the illuminant detection region determined by the EIT is appropriate, through whether the region on the chromaticity coordinates corresponding to the central point 660 of the color gamut of the input image overlaps the illuminant detection region determined in accordance with the EIT. If the region on the chromaticity coordinates corresponding to the central point 660 of the color gamut is identical or sufficiently similar to the illuminant detection region determined by the EIT, the illuminant detection region determined by the EIT can be used as it is. However, if the region on the chromaticity coordinates corresponding to the central point 660 of the color gamut is not identical or sufficiently similar to the illuminant detection region determined by the EIT, the color gamut of the input image can be set as the illuminant detection region irrespective of the EIT.

Figure 7:
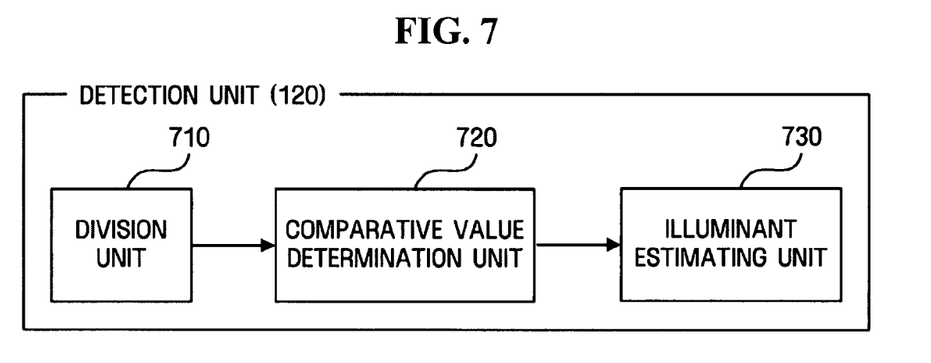
FIG. 7 illustrates a detection unit, according to an embodiment of the present invention.

An operation of detecting the illuminant may, thus, be performed by the detection unit 120 in FIG. 1, for example, and may correspond to operation S220 in FIG. 2, also for example, noting that alternative operations and units for accomplishing the same are equally available. The detection unit 120 may include, as shown in FIG. 7, a division unit 710, a comparative value determination unit 720, and an illuminant estimation unit 730, for example.

Figure 8:
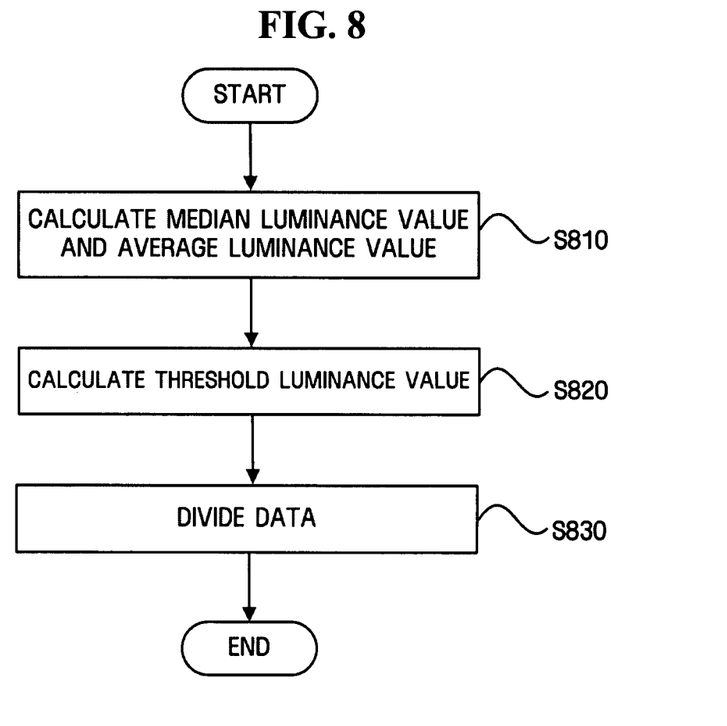
FIG. 8 illustrates an operation of a division unit, according to an embodiment of the present invention.

The division unit 710 may divide the data contained in the illuminant detection region, e.g., as set by the setting unit 110 in the color gamut of an input image, into two groups on the basis of luminance. FIG. 8 illustrates an example operation of the division unit 710, noting that alternative operations and units for accomplishing the same are equally available.

In reference to FIG. 8, an average luminance value and a mean luminance value of the data contained in the illuminant detection region may be calculated, in operation S810. Threshold number of data (referred to as superior luminance data) may be further sorted in order of high luminance value among luminance distribution of the data contained in the illuminant detection region, and the same number of data as that of the superior luminance data in order of low luminance value. In an embodiment, the average luminance value $Y_{thresh}$ may be calculated from a mean between an average value of the luminance values of the upper luminance data and an average value of the luminance values of lower luminance data. In addition, the mean luminance value $Y_{avg}$ may be calculated by an average of the luminance values of all data contained in the illuminant detection region.

Then, a threshold luminance value may be calculated to be used to divide the data in the illuminant detection region into two groups by using the average luminance value and the mean luminance value, in operation S820. The threshold luminance value may be determined by a weighted sum of the average luminance value of the data contained in the illuminant detection region and the mean luminance value thereof, which may be expressed by the below Equation 1, for example.

$$Y_{thresh} = k \cdot Y_{median} + (1-k) \cdot Y_{avg} \qquad \text{Equation 1:}$$

Here, $Y_{thresh}$ is a threshold luminance value to be calculated, $Y_{median}$ is a median luminance value, and $Y_{avg}$ is an average luminance value. In addition, k may be a weighted value of 0 or 1, for example.

If the threshold luminance value is calculated, the data in the illuminant detection region may be divided into two groups on the basis of the threshold luminance value, in operation S830. For example, the data having a luminance more than a threshold luminance value among the data in the illuminant detection region may be classified into the first group, and the data having a luminance less than a threshold luminance value may be classified into the second group.

Figure 9:
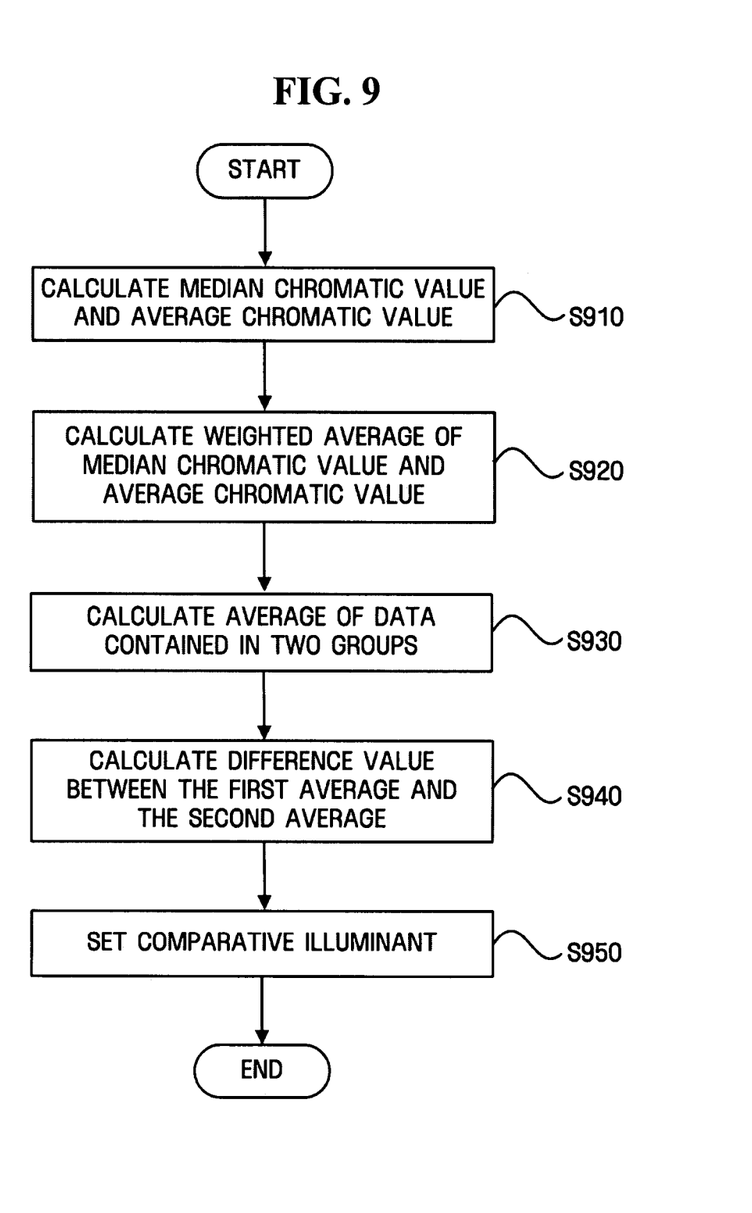
FIG. 9 illustrates an operation of a comparative value determination unit, according to an embodiment of the present invention.

The comparative value determination unit 720 in FIG. 7 may set a comparative illuminant to be a standard of determining the illuminant. FIG. 9 illustrates an example operation of the comparative value determination unit 720, noting that alternative operations and units for accomplishing the same are equally available.

In reference to FIG. 9, an average may be calculated of an average chromatic value of the data contained in the illuminant detection region and a mean chromatic value thereof, in operation S910. Here, for example, the average chromatic value may be calculated by the average of the chromatic values of the data contained in the illuminant detection region, and the median chromatic value may be calculated by a chromatic value of the center point of the illuminant detection region.

Then, a weighted average may be calculated of the average chromatic value and the median chromatic value, in operation S920, as expressed by the below Equation 2, for example.

$$Ch_w = m \cdot Ch_{avg} + (1-m) \cdot Ch_{median} \qquad \text{Equation 2:}$$

Here, $Ch_w$ is a weighted average to be calculated, $Ch_{avg}$ is an average chromatic value, and $Ch_{median}$ is a median chromatic value. In addition, m may be a weighted value of 0 or 1, for example.

An average may be calculated of chromatic values of the data contained in each of two divided groups, e.g., as divided by the division unit 710, in operation S930. Hereinafter, the average of the chromatic values of the data contained in the first group will be referred to as the first average, and the average of the chromatic values of the data contained in the second group will be referred to as the second average.

A difference value may further be calculated between the first average and the second average, in operation S940. Next, a comparative illuminant may be set by using the weighted average $Ch_w$, e.g., calculated in the operation S920, the difference value, e.g., calculated in the operation S940, and a standard illuminant (e.g., D65, D50, CWF, A, Horizon, and the others) of a device providing a corresponding image frame (e.g., a digital still camera comprising the white balancing system 100) as an input value, in operation S950. In order to obtain the comparative illuminant, the below Equation 3 may be used, for example.

$$W_{ref}(r,b) = F_2(F_1(Ch_w, DEV_w), Ch_{dist}) \qquad \text{Equation 3:}$$

Here, $W_{ref}(r,b)$ is a chromatic value of the comparative illuminant, $Ch_w$ is a weighted average calculated in operation S920, for example, $DEV_w$ is a standard illuminant, and $Ch_{dist}$ is a difference value between the first average and the second average calculated in the operation S940, for example. In addition, F1 may be a quadratic correlation function, and F2 may be a linear correlation function.

The correlation function F1 may be a function reflecting a correlation between the standard illuminants and $Ch_w$ under the standard illuminant, and a substantial comparative estimating function to estimate the point of the illuminant in the image, for example. The correlation function F2 may be a modeling function considering $Ch_{dist}$ in the standard illuminant locus function, and a function to compensate a performance of a comparative illuminant estimation of the correlation function F1, for example.

The order of functions F1 and F2 can be varied, and F1 and F2 may be set as a quadratic function and a linear function, respectively, as one example of optimizing its complexity. A concrete embodiment of F1 and F2 can be easily understood through the below Equations 4 through 6, for example.

$$\Sigma(|DEV_w - \alpha^* Ch_w^2 - \beta^* Ch_w - \gamma|) \cong 0 \qquad \text{Equation 4:}$$

$$F_1 = \alpha^* Ch_w^2 + \beta^* Ch_w + \gamma \qquad \text{Equation 5:}$$

$$F_2 = \theta^*(F_1(Ch_w, DEV_w) \pm Ch_{dist}) + \zeta \qquad \text{Equation 6:}$$

Here, in Equations 4 through 6, $\alpha$, $\beta$, $\gamma$, $\theta$, and $\zeta$ are a certain real number, and may be determined as a proper value based on experiment results. For example, $\alpha$, $\beta$, and $\gamma$ may preferably exist as in the relation in Equation 4, noting that alternative embodiments are equally available.

Referring again to FIG. 7, in identifying the initial illuminant, the illuminant estimation unit 730 may determine the point, in which a chromatic difference between the comparative illuminant, e.g., as determined in the above operation S950, and any one of the first average and the second average, e.g., as calculated in the above operation S940, as the initial illuminant. That is, the illuminant estimation unit 730 may calculate a chromatic difference (referred to as first chromatic difference) between the first average and the comparative illuminant, and a chromatic difference (referred to as second chromatic difference) between the second average and the comparative illuminant, and compare the first chromatic difference and the second chromatic difference. If the first chromatic difference is smaller than the second chromatic difference, the first average may be determined to be the initial illuminant, while if the second chromatic difference is smaller than the first chromatic difference, the second average may be determined to be the initial illuminant.

Figure 10:
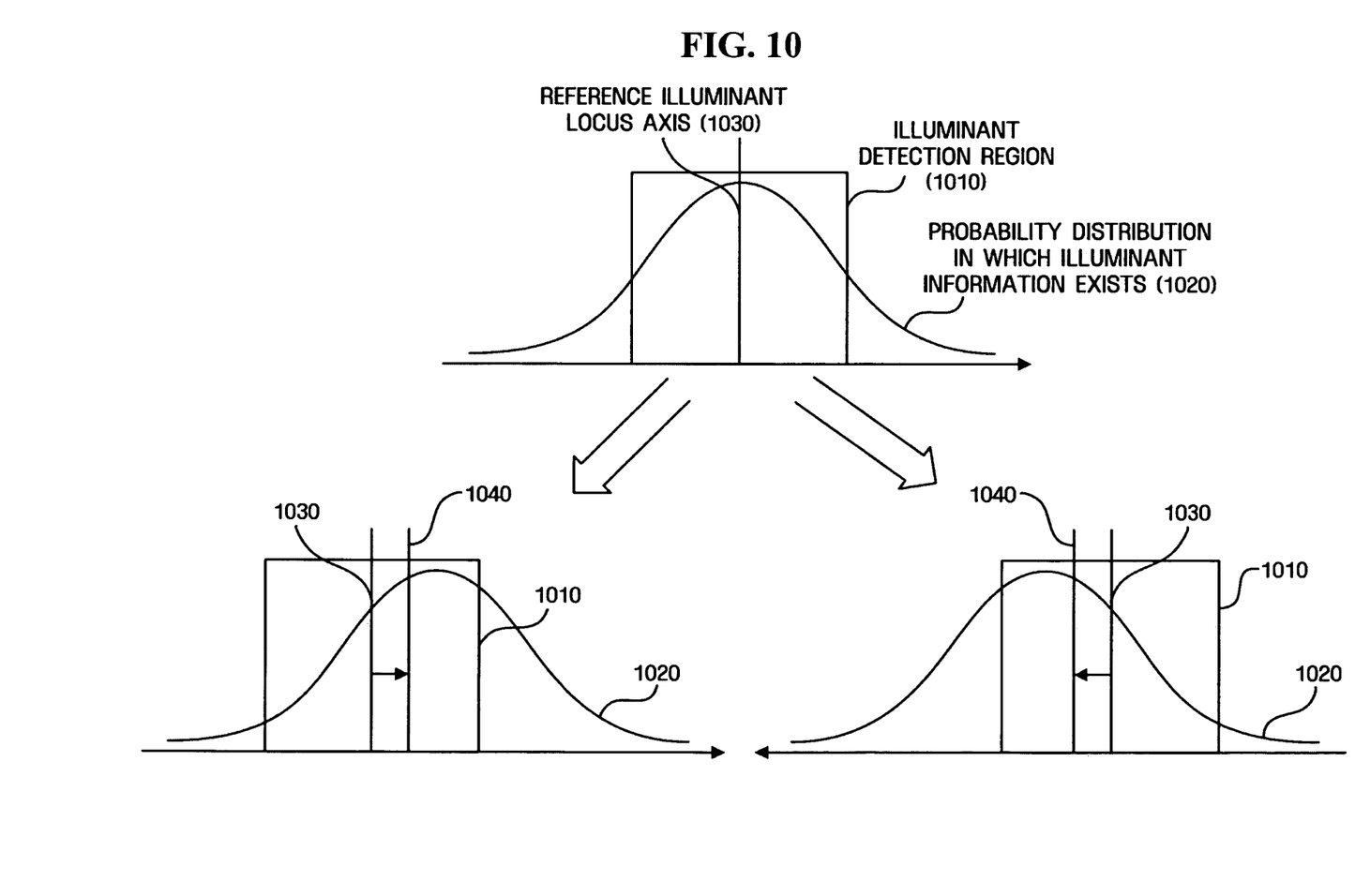
FIG. 10 is an illustration explaining the inconsistency between the illuminant distribution probability and a reference illuminant locus axis.

With reference to FIG. 10, distorted information may be reflected in the illuminant detected by the detection unit 120 in accordance with the deflection between devices providing the image or an amount of data sampled to detect the illuminant. For example, if the illuminant is detected according to the data contained in the illuminant detection region, the position of the illuminant detection region may be determined to be in the specified range in accordance with the EIT, but the amount of data or the chromaticity information to be input into the illuminant detection region may be varied depending upon the chromaticity variation of the device providing the image. In this instance, since the illustrated probability distribution 1020 in which the illuminant information exists in the illuminant detection region 1010 may not conform to the reference illuminant locus axis 1030, it becomes desirable to provide a new illuminant locus axis 1040 by adjusting the reference illuminant locus axis 1030.

Figure 11:
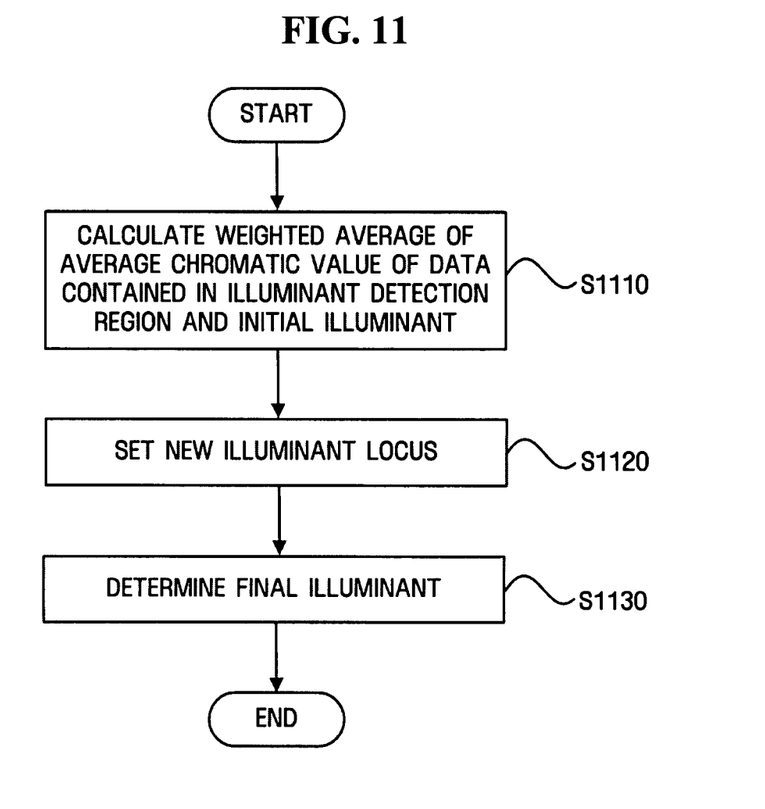
FIG. 11 illustrates a correcting of an illuminant, according to an embodiment of the present invention.

In order to compensate this distortion phenomenon, the stabilization unit 130, for example, may stabilize the initial illuminant detected by the detection unit 120 based on the reference illuminant locus and the average chromatic value of data input into the illuminant detection region in the color gamut of the input image. FIG. 11 illustrates an example operation of the stabilization unit 130, noting that alternative operations and units for accomplishing the same are equally available.

In reference to FIG. 11, the stabilization unit 130 may calculate a weighted average point between the average chromatic value of data input into the illuminant detection region in the color gamut of the image and the chromatic value of the initial illuminant, in operation S1110. The weighted average may be expressed by the below Equation 7, for example.

$$W_{avg} = N \cdot W_i + (1-N) \cdot Ch_{avg} \quad \text{Equation 7:}$$

Here, $W_{avg}$ is a weighted value to be calculated, $W_i$ is a chromatic value of the initial illuminant, e.g., as determined by the illuminant estimation unit 730, and $Ch_{avg}$ is an average of chromatic values of the data contained in the illuminant detection region. $Ch_{avg}$ is also used in Equation 2. In addition, N may be a weighted value of 0 or 1, for example.

Figure 12A:
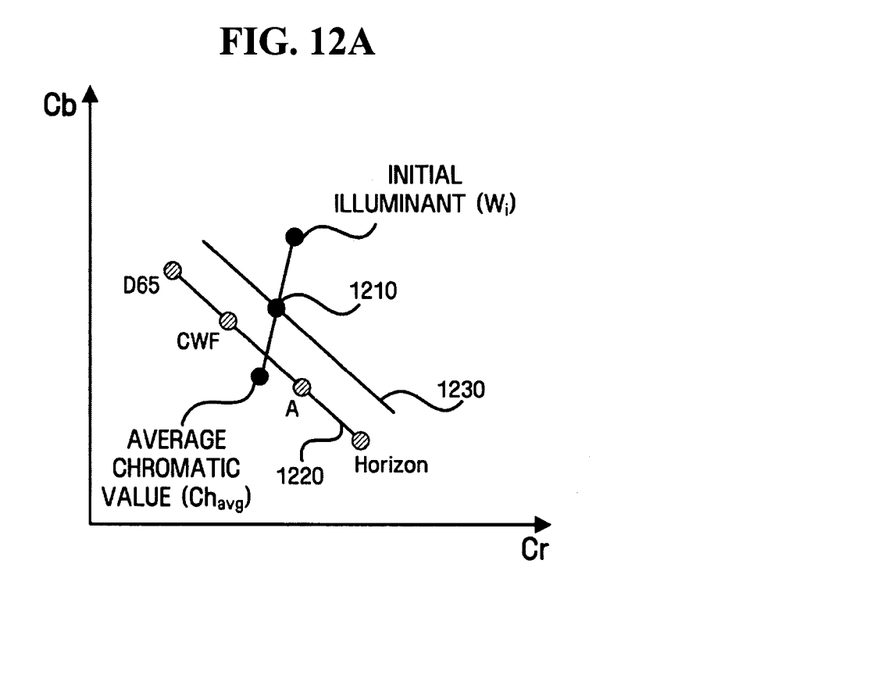
FIGS. 12A and 12B are illustrations explaining a correcting of an illuminant, according to an embodiment of the present invention.

As shown in FIG. 12A, a new illuminant locus 1230 which contains a weighted average point 1210 and is parallel with the reference illuminant locus 1220 may then be set, in operation S1120.

Figure 12B:
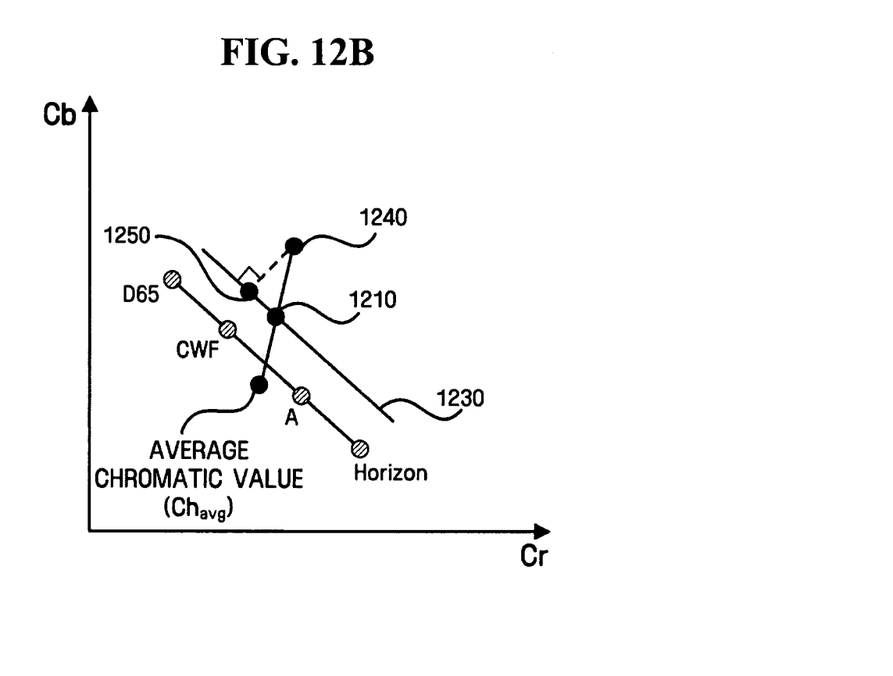

Further, as shown in FIG. 12B, a point 1250 in which the initial illuminant 1240 is projected on the new illuminant locus 1230 in a vertical direction may be determined, in operation S1130.

In embodiments of the present invention, the term "unit" indicating a respective component of the white balancing system 100, for example, may be constructed as a module, for example. Here, the term "module", as used herein, means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operation provided for in the components and modules may be combined into fewer components and modules or further separated into additional components and modules.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

In accordance with the above description, one or more embodiments of the present invention include a white balancing method, medium, and system, where the color reproducing performance can be improved through more stabilized illuminant estimation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method with white balancing, comprising:
    setting an illuminant detection region within a chrominance space of an image based on an exposure integration time (EIT) indicative of an amount of light collected for the image when the image was captured, the EIT being used to determine a range of the illuminant detection region; and
    detecting an illuminant of the image, by using data relative to the set illuminant detection region, within a color gamut of the image corresponding to the set illuminant detection region.

2. The method of claim 1, wherein the setting of the illuminant detection region comprises determining a candidate region which corresponds to the exposure integration time, from among a plurality of predefined candidate regions set in accordance with respective exposure integration times, as the illuminant detection region.

3. The method of claim 1, wherein the setting of the illuminant detection region comprises determining a given range, as the illuminant detection region, from a point corresponding to the exposure integration time in a specified locus on predefined chromaticity coordinates set based on a degree of illuminant distribution according to respective exposure integration times.

4. The method of claim 3, wherein the given range is variable depending upon the exposure integration time.

5. The method of claim 1, wherein the setting of the illuminant detection region further comprises determining the illuminant detection region by using at least one of a variance of the color gamut of the image, obtained using reference points in the chrominance space, and a center point of the color gamut.

6. The method of claim 5, wherein the determining of the illuminant detection region comprises adjusting the illuminant detection region based on whether the variance of the color gamut satisfies a specified threshold range.

7. The method of claim 1, wherein the detecting of the illuminant comprises:
    dividing the data relative to the illuminant detection region into a first group and a second group in accordance with luminance distribution of the data relative to the illuminant detection region in the color gamut of the image; and
    determining at least one of a first average luminance value of data relative to the first group and a second average luminance value of data relative to the second group as the illuminant.

8. The method of claim 7, wherein the dividing comprises dividing the data relative to the illuminant detection region into the first group and the second group based on a threshold luminance value derived from a weighted sum of an average luminance value of the data relative to the illuminant detection region and a median luminance value of the illuminant detection region.

9. The method of claim 7, wherein the determining of the at least one of the first average luminance value and the second average luminance value comprises determining any one of the first average luminance value and the second average luminance value as the illuminant, in which when a chromatic difference between the first average luminance value and a given comparative illuminant and a chromatic difference between the second average luminance value and the given comparative illuminant are compared, based on a respective lowest chromatic difference.

10. The method of claim 9, wherein the comparative illuminant is obtained from a correlation function using at least one among a weighted average value between an average chromatic value of the data relative to the illuminant detection region and a median chromatic value of the illuminant detection region, a difference value between the first average luminance value and the second average luminance value, and standard illuminant information of a system which captured the image, as an input value.

11. The method of claim 1, further comprising compensating the detected illuminant.

12. The method of claim 11, wherein the compensating comprises modifying the detected illuminant by setting a point, in which the detected illuminant is perpendicularly reflected on a given illuminant locus, as the detected illuminant.

13. The method of claim 12, wherein the given illuminant locus is parallel to a trend line of a plurality of standard illuminants associated with a characteristic of a system which captured the image, and has a weighted average point of a chromatic value of the detected illuminant and an average chromatic value of the data relative to the set illuminant detection region.

14. The method of claim 1, further comprising performing white balancing on the image based on the determined illuminant.

15. At least one non-transitory medium comprising computer readable code to control at least one processing element to implement the method of claim 1.

16. A method with white balancing, comprising:
  setting an illuminant detection region within a chrominance space of an image based on an exposure integration time indicative of an amount of light collected for the image when the image was captured; and
  detecting an illuminant of the image, by using data relative to the set illuminant detection region, within a color gamut of the image corresponding to the set illuminant detection region,
  wherein the detecting of the illuminant comprises:
  dividing the data relative to the illuminant detection region into a first group and a second group in accordance with luminance distribution of the data relative to the illuminant detection region in the color gamut of the image; and
  determining at least one of a first average luminance value of data relative to the first group and a second average luminance value of data relative to the second group as the illuminant,
  wherein the determining of the at least one of the first average luminance value and the second average luminance value comprises determining any one of the first average luminance value and the second average luminance value as the illuminant, in which when a chromatic difference between the first average luminance value and a given comparative illuminant and a chromatic difference between the second average luminance value and the given comparative illuminant are compared, based on a respective lowest chromatic difference,
  wherein the comparative illuminant is obtained from a correlation function using at least one among a weighted average value between an average chromatic value of the data relative to the illuminant detection region and a median chromatic value of the illuminant detection region, a difference value between the first average luminance value and the second average luminance value, and standard illuminant information of a system which captured the image, as an input value,
  wherein the correlation function is a linear correlation function using a resultant value of a sub-correlation function and the difference value as an input value, and the sub-correlation function is a quadratic correlation function using the weighted average value and the standard illuminant information as an input value.

17. A system, comprising:
  a setting unit to set an illuminant detection region within a chrominance space of an image based on an exposure integration time (EIT) indicative of an amount of light collected for the image when the image was captured, the EIT being used to determine a range of the illuminant detection region; and
  a detection unit to detect an illuminant of the image, by using data relative to the set illuminant detection region, within a color gamut of the image corresponding to the set illuminant detection region.

18. The system of claim 17, wherein the setting unit determines a candidate region which corresponds to the exposure integration time, from among a plurality of predefined candidate regions set in accordance with respective exposure integration times, as the illuminant detection region.

19. The system of claim 17 wherein the setting unit determines a given range, as the illuminant detection region, from a point corresponding to the exposure integration time in a specified locus on predefined chromaticity coordinates set based on a degree of illuminant distribution according to respective exposure integration times.

20. The system of claim 19, wherein the given range is variable depending upon the exposure integration time.

21. The system of claim 17, wherein the setting unit determines the illuminant detection region by using at least one of a variance of the color gamut of the image, obtained using reference points in the chrominance space, and a center point of the color gamut.

22. The system of claim 21, wherein the setting unit adjusts the illuminant detection region according to whether the variance of the color gamut satisfies a specified threshold range.

23. The system of claim 17, wherein the setting unit comprises:
  a division unit to divide the data relative to the illuminant detection region into a first group and a second group in accordance with luminance distribution of the data relative to the illuminant detection region in the color gamut of the image; and
  an illuminant determination unit to determine at least one of a first average luminance value of data relative to the first group and a second average luminance value of the data relative to the second group as the illuminant.

24. The system of claim 23, wherein the division unit divides the data relative to the illuminant detection region into the first group and the second group based on a threshold luminance value derived from a weighted sum of an average luminance value of the data relative to the illuminant detection region and a median luminance value of the illuminant detection region.

25. The system of claim 23, wherein the illuminant determination unit determines any one of the first average luminance value and the second average luminance value as the illuminant, in which when a chromatic difference between the first average luminance value and a given comparative illuminant and a chromatic difference between the second average luminance value and the given comparative illuminant are compared, based on a respective lowest chromatic difference.

26. The system of claim 25, wherein the comparative illuminant is obtained from a correlation function using at least one among a weighted average value between an average chromatic value of the data relative to the illuminant detection region and a median chromatic value of the illuminant detection region, a difference value between the first average luminance value and the second average luminance value, and standard illuminant information of a system which captured the image, as an input value.

27. The system of claim 17, further comprising a stabilization unit compensating the detected illuminant.

28. The system of claim 27, wherein the stabilization unit modifies the detected illuminant by setting a point, in which the detected illuminant is perpendicularly reflected on a given illuminant locus, as the detected illuminant.

29. The system of claim 28, wherein the given illuminant locus is parallel to a trend line of a plurality of standard illuminants associated with a characteristic of a system which captured the image, and, has a weighted average point of a chromatic value of the detected illuminant and an average chromatic value of the data relative to the illuminant detection region.

30. The system of claim 17, further comprising a white balancing unit which performs white balancing on the image based on the detected illuminant.

31. A system, comprising:
a setting unit to set an illuminant detection region within a chrominance space of an image based on an exposure integration time indicative of an amount of light collected for the image when the image was captured; and
a detection unit to detect an illuminant of the image, by using data relative to the set illuminant detection region, within a color gamut of the image corresponding to the set illuminant detection region,
wherein the setting unit comprises:
a division unit to divide the data relative to the illuminant detection region into a first group and a second group in accordance with luminance distribution of the data relative to the illuminant detection region in the color gamut of the image; and
an illuminant determination unit to determine at least one of a first average luminance value of data relative to the first group and a second average luminance value of the data relative to the second group as the illuminant,
wherein the illuminant determination unit determines any one of the first average luminance value and the second average luminance value as the illuminant, in which when a chromatic difference between the first average luminance value and a given comparative illuminant and a chromatic difference between the second average luminance value and the given comparative illuminant are compared, based on a respective lowest chromatic difference,
wherein the comparative illuminant is obtained from a correlation function using at least one among a weighted average value between an average chromatic value of the data relative to the illuminant detection region and a median chromatic value of the illuminant detection region, a difference value between the first average luminance value and the second average luminance value, and standard illuminant information of a system which captured the image, as an input value,
wherein the correlation function is a linear correlation function using a resultant value of a sub-correlation function and the difference value as an input value, and the sub-correlation function is a quadratic correlation function using the weighted average value and the standard illuminant information as an input value.

* * * * *